US009556947B2

(12) United States Patent
Hiller et al.

(10) Patent No.: US 9,556,947 B2
(45) Date of Patent: Jan. 31, 2017

(54) BIDIRECTIONAL GEAR, METHOD, AND APPLICATIONS

(75) Inventors: Jonathan Hiller, Ithaca, NY (US); David A. Hjelle, West Fargo, ND (US); Hod Lipson, Ithaca, NY (US); Franz Nigl, Ithaca, NY (US)

(73) Assignee: Cornell University, Ithaca, NY (US)

( * ) Notice: Subject to any disclaimer, the term of this patent is extended or adjusted under 35 U.S.C. 154(b) by 820 days.

(21) Appl. No.: 13/582,503

(22) PCT Filed: Mar. 4, 2011

(86) PCT No.: PCT/US2011/027146
§ 371 (c)(1),
(2), (4) Date: Nov. 14, 2012

(87) PCT Pub. No.: WO2011/109687
PCT Pub. Date: Sep. 9, 2011

(65) Prior Publication Data
US 2013/0055838 A1    Mar. 7, 2013

Related U.S. Application Data

(60) Provisional application No. 61/310,886, filed on Mar. 5, 2010.

(51) Int. Cl.
*F16H 55/26* (2006.01)
*F16H 19/04* (2006.01)

(52) U.S. Cl.
CPC .............. *F16H 55/26* (2013.01); *F16H 19/04* (2013.01); *Y10T 29/49462* (2015.01); *Y10T 74/19674* (2015.01)

(58) Field of Classification Search
CPC ..... F16H 55/26; F16H 19/04; Y10T 74/19674
See application file for complete search history.

(56) References Cited

U.S. PATENT DOCUMENTS 22,116 A * 11/1858 Ganster ................. F16H 55/10
74/415
498,552 A * 5/1893 Hunt ..................... F16H 25/06
74/395

(Continued)

FOREIGN PATENT DOCUMENTS

EP       0068633      5/1982
JP       3097201      8/2003

(Continued)

OTHER PUBLICATIONS

Cornell University, Bidirectional Gear, http://www.ibridgenetwork.org/cornell/bidirectional-gear, May 17, 2010, pp. 1-2.

(Continued)

*Primary Examiner* — David M Fenstermacher
(74) *Attorney, Agent, or Firm* — Bond, Schoeneck & King, PLLC; William Greener (57) ABSTRACT

A bidirectional gear set includes a male bidirectional gear component having an array of addendum teeth and a female bidirectional gear component having an array of dedendum sockets, wherein each dedendum socket has a full boundary edge around an open end thereof. One or both of the male and female gear components may have a circular cross sectional geometry, or one may have a non-circular cross sectional geometry. The non-circular cross sectional geometry may be a flat sheet or a sheet with surface contour. In an intermeshed state, neither the male nor the female component can 'slide' relative to the other regardless of whether the male and female components are arranged in a parallel or perpendicular orientation. A method of making a bidirectional gear set is disclosed.

21 Claims, 9 Drawing Sheets

(56) References Cited

U.S. PATENT DOCUMENTS

| | | | |
|---|---|---|---|
| 2,453,656 A | 11/1948 | Bullard | |
| 2,973,658 A * | 3/1961 | Bishop | B62D 3/12 |
| | | | 180/428 |
| 2,973,660 A * | 3/1961 | Popper | F16H 1/18 |
| | | | 475/226 |
| 3,461,601 A * | 8/1969 | Kristiansen | A63H 33/042 |
| | | | 446/103 |
| 3,812,736 A | 5/1974 | Nickstadt | |
| 3,851,537 A | 12/1974 | Nickstadt | |
| 4,051,934 A | 10/1977 | Hurst | |
| 4,062,250 A * | 12/1977 | Lahl | G06M 1/163 |
| | | | 74/415 |
| 4,204,112 A | 5/1980 | Lane | |
| 4,478,103 A | 10/1984 | Benjamin | |
| 4,602,527 A * | 7/1986 | Tamiya | B60K 17/16 |
| | | | 475/220 |
| 4,753,427 A | 6/1988 | Lodrick, Sr. | |
| 5,209,134 A | 5/1993 | Nguyen et al. | |
| 5,251,504 A * | 10/1993 | Summerville, Jr. | B62M 17/00 |
| | | | 280/238 |
| 5,497,671 A * | 3/1996 | Rourke | F16H 1/12 |
| | | | 74/415 |
| 5,724,196 A | 3/1998 | Ichino | |
| 6,151,941 A | 11/2000 | Woolf et al. | |
| 6,158,296 A * | 12/2000 | Denance | F16H 3/366 |
| | | | 74/351 |
| 6,517,772 B1 * | 2/2003 | Woolf | B21H 5/022 |
| | | | 419/28 |
| 6,786,497 B1 | 9/2004 | Olszewski | |
| 7,213,491 B1 | 5/2007 | Thompson et al. | |
| 7,526,976 B2 * | 5/2009 | Cheng | F16H 27/06 |
| | | | 74/112 |
| 7,651,436 B2 | 1/2010 | Sugitani | |
| 7,762,156 B2 * | 7/2010 | Chang | B25J 9/104 |
| | | | 74/490.04 |
| 8,567,280 B2 * | 10/2013 | Bogar | F16H 1/163 |
| | | | 74/424.5 |
| 8,851,226 B2 * | 10/2014 | Culver | B62D 3/12 |
| | | | 180/400 |
| 2002/0170374 A1 * | 11/2002 | Stewart | F16H 55/08 |
| | | | 74/465 |
| 2007/0125203 A1 | 6/2007 | Nguyen | |
| 2007/0137352 A1 | 6/2007 | Hrushka | |
| 2009/0032758 A1 * | 2/2009 | Stevenson | B60H 1/00692 |
| | | | 251/248 |

FOREIGN PATENT DOCUMENTS

| | | |
|---|---|---|
| WO | 2004107914 | 12/2004 |
| WO | 2006042816 | 4/2006 |

OTHER PUBLICATIONS

Yang, Kyung Jinn, PCT International Search Report/Written Opinion, Nov. 14, 2011, KIPO.

* cited by examiner

BIDIRECTIONAL GEAR, METHOD, AND APPLICATIONS

RELATED APPLICATION DATA

The instant application claims priority to U.S. Provisional application Ser. No. 61/310,886 filed on Mar. 5, 2010, the subject matter of which is incorporated herein by reference in its entirety.

GOVERNMENT FUNDING

This invention was made with Government support under Grant Number 0735953 awarded by the National Science Foundation.—Office of Emerging Frontiers in Research and Innovation. The United States Government has certain rights in the invention.

BACKGROUND

1. Field of the Invention

Embodiments of the invention are in the field of gear structures and, more particularly, pertain to bidirectional gear structures and gear structure pairs (sets), a method for making, and applications thereof.

2. Related Art

Gears are used extensively in engineering. Numerous different gear designs exist that are specialized for the individual needs of various applications. A non-limiting sample of the different existing gears includes: spur gears, rack and pinion gears, internal ring gears, helical gears, helical rack gears, face gears, worm gears, double enveloping worm gears, hypoid gears, straight bevel gears, spiral bevel gears, and screw gears. All of these gears are capable of transmitting motion or power in one direction. Gears can be designed to have the output gear shaft perpendicular to the input gear shaft, like bevel gears, with which the power transmission direction can be changed by 90 degrees. However, there is still only one power and motion transmission direction with a pair of gears. To achieve motion in two different directions more than two gears are typically needed.

Bullard U.S. Pat. No. 2,453,656 discloses rack and pinion gear means comprising an arrangement of positive acting, intermeshing means for transmitting oscillatory and reciprocatory motions between two angularly-related shafts. More particularly, with reference to FIG. 1, a toothed member A is keyed to a shaft 10, which can be reciprocated along and oscillated about its longitudinal axis. A similar toothed member B is keyed to a shaft 11 at substantially right angles to shaft 10, which shaft 11 can also be oscillated about and reciprocated along its longitudinal axis. Each of the members A and B comprises relatively long bodies 12 having elongated spur gear teeth 13 formed about their peripheries. Equally-spaced circumferential grooves 14 are cut in the teeth 13 to a depth of or slightly below, the pitch circle of the spur teeth 13. These grooves 14 are machined such that the walls 15 formed by them conform to addendum surface 16 of the spur teeth 13. The grooves 14, therefore, provide axially-aligned teeth having dedendum height only, which alternate with teeth in the same axial row having both addendum and dedendum height. Additionally, these grooves form circumferential rows of teeth having dedendum height only, which rows alternate with circumferential rows of teeth having both addendum and dedendum height.

A developing application of bi-directional gears is robots. For example, structure-climbing robots have traditionally been developed to perform tasks currently carried out by humans, ranging from structural inspections to cleaning and maintenance. One object of the inventors' work is to explore both robot and structure design to expand the range of tasks that can be successfully completed autonomously. For example, a robot capable of modifying a structure by taking it apart and rebuilding it into a different shape would be advantageous. Such 'structure-reconfiguring' robots could have a profound impact on construction processes, especially activities involving frame construction. Furthermore, the ability to autonomously repair a damaged structure or autonomously adapt an existing structure to a new function can have applications ranging from disaster recovery to space exploration.

One of the key challenges in designing a structure-reconfiguring robot is that most current structural building blocks are designed for manipulation by humans, not by machines. Structural joints require complex assembly, and truss elements are cumbersome to manipulate. The development of standards for joint connections and elements has been crucial in the progress of modular assembly in the construction industry. Furthermore, the lack of robot-friendly joints and elements has significantly limited the deployment of robots in the construction field. It would be particularly advantageous to have a structure-reconfiguring robot that could maneuver between the horizontal and vertical planes of a structure and traverse multiple nodes in one run. Bi-directional gear drives may make this capability a possibility. The gear means described in Bullard '656 (referred to above) do not provide this capability because the similar crossed gear shafts cannot prevent their relative sliding when they are in a parallel orientation, but only when they are in a perpendicular orientation.

The inventors have recognized a need for, and the benefits of, a solution to, e.g., the problems faced in the successful development of structure-reconfiguring robots, which solutions the aforementioned art do not provide.

SUMMARY

Embodiment of the invention are directed to a male bidirectional gear component, a female bidirectional gear component, and a bidirectional gear set. According to an aspect, the gear set includes a male bidirectional gear component having an array of addendum teeth and a female bidirectional gear component having an array of dedendum sockets, wherein each dedendum socket has a full boundary edge around an open end thereof. Each of the male and female arrays of teeth and sockets are rectangular, non-helical arrays. In various aspects, one or both of the male and female gear components may have a circular cross sectional geometry, or one may have a non-circular cross sectional geometry. The non-circular cross sectional geometry may be a flat sheet or a sheet with surface contour. Either the male and female gear component may have a cylindrical geometry with a length along a longitudinal axis that is greater than a diameter along a radial axis that is perpendicular to the longitudinal axis. In an intermeshed state, neither the male nor the female component can 'slide' relative to the other regardless of whether the male and female components are arranged in a parallel or perpendicular orientation. According to the embodied invention, the male and female gear components are limited to motion along a single common axis of movement in an intermeshed, operational state. According to the embodied invention, both the addendum teeth and the dedendum sockets are each cut in two directions.

An embodiment of the invention is directed to a method of making a bidirectional gear set including a male bidirectional gear component having an array of addendum teeth and a female bidirectional gear component having an array of dedendum sockets. In an aspect, the method covers making either only the male gear component or the female gear component. The method further includes one or both steps of creating the female bidirectional gear component having an array of dedendum sockets, wherein each dedendum socket has a perimetal ridge on an open end thereof, and/or creating the male bidirectional gear component having an array of addendum teeth wherein each addendum tooth has at least two opposing symmetrical cuts. According to an aspect, the method for creating the female bidirectional gear component further involves the Boolean merging of swept spur gear profiles along two orthogonal axes of a surface. According to an aspect, the method further involves making the female bidirectional gear component in a cylindrical geometry that further comprises the steps of revolving a contour of a circular spur gear rack around a rod axis, and merging the revolved spur gear rack with a spur gear thread in the orthogonal direction. The female bidirectional gear component may further be made in the form of a sheet. The sheet form may be in the form of a flat sheet or a sheet having a surface contour. According to an aspect, the method for creating the male bidirectional gear component further involves the Boolean subtraction of a swept spur gear profile from a second swept spur gear profile along two orthogonal axes of a surface. According to an aspect, the method further involves making the male bidirectional gear component in a cylindrical geometry that further comprises the steps of revolving an outside contour of a spur gear rack around, and subtracting from, a spur gear. The male bidirectional gear component may be made in the form of a sheet. The sheet form may be in the form of a flat sheet or a sheet having a surface contour. In various non-limiting aspects, the male bidirectional gear component can be made by cutting a suitable design in a spur gear rod; rapid prototyping; casting; molding; cold or warm forming using a female bidirectional gear, CNC machining; and 3-D printing, and the female bidirectional gear component can be made by rapid prototyping; casting; cold or warm forming using a male bidirectional gear; molding; CNC machining; and 3-D printing.

DETAILED DESCRIPTION OF EXEMPLARY EMBODIMENTS

In the following description, reference is made to the accompanying drawings that form a part hereof, and in which are shown by way of illustration specific embodiments that may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense.

As used herein, the term 'bidirectional' means gear-driven motion in both a translational state and a rotational state (as well as back and forth in both of these states).

As used herein, the term "addendum' means having a positive structural presence such as that of a gear tooth, whereas the term 'dedendum' means having a negative structural presence such as that of a recess or socket having a perimetal ridge on an open end thereof, into which a gear tooth can operatively mesh.

As used herein, the term 'stationary' means not in motion, whereas the term 'motionary' means in operative motion (e.g., translational or rotational).

Figure 1A:
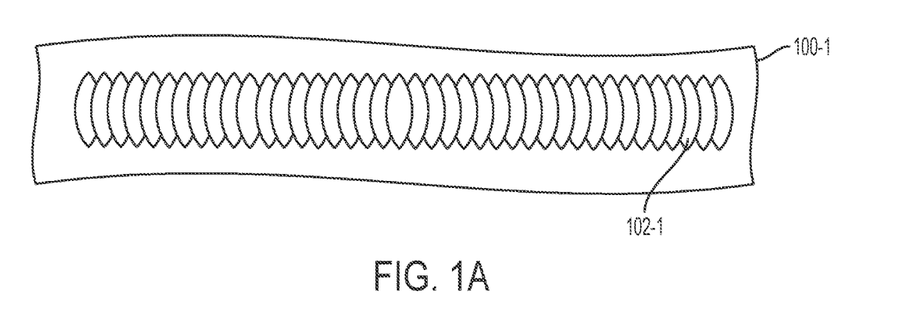
FIGS. 1A, B, respectively, show a male bidirectional gear component and a female bidirectional gear component in the form of elongate cylindrical rods, according to an illustrative, exemplary embodiment of the invention.

FIG. 1A shows a male bidirectional gear component 100-1 in the form of an elongate cylindrical rod made using a rapid prototyping machine. The male gear component 100-1 has a linear plurality of radial rows of outwardly-projecting (i.e., addendum) teeth 102-1 as may be seen in expanded detail in FIGS. 4 and 6. Each row of addendum teeth has radial axes that are normal to a central longitudinal axis of the gear component. Thus each of the two male bidirectional gear components 100-4 shown in FIG. 4 have two rows of addendum teeth 102-4. As shown, each of the addendum teeth has four symmetrically opposing faces.

Figure 1B:
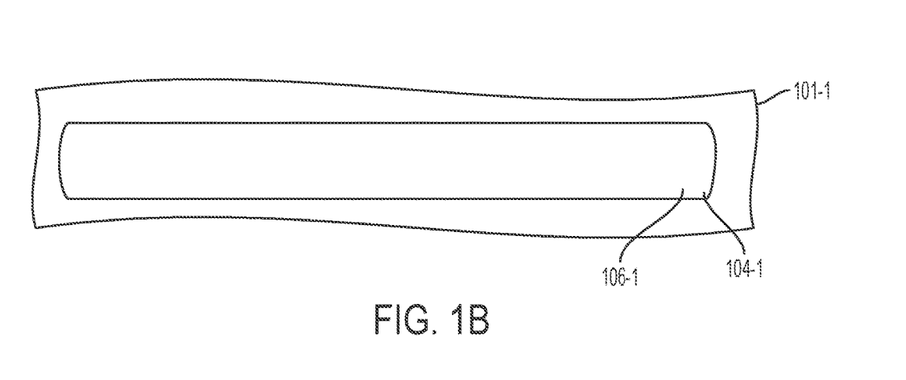
Figure 4:
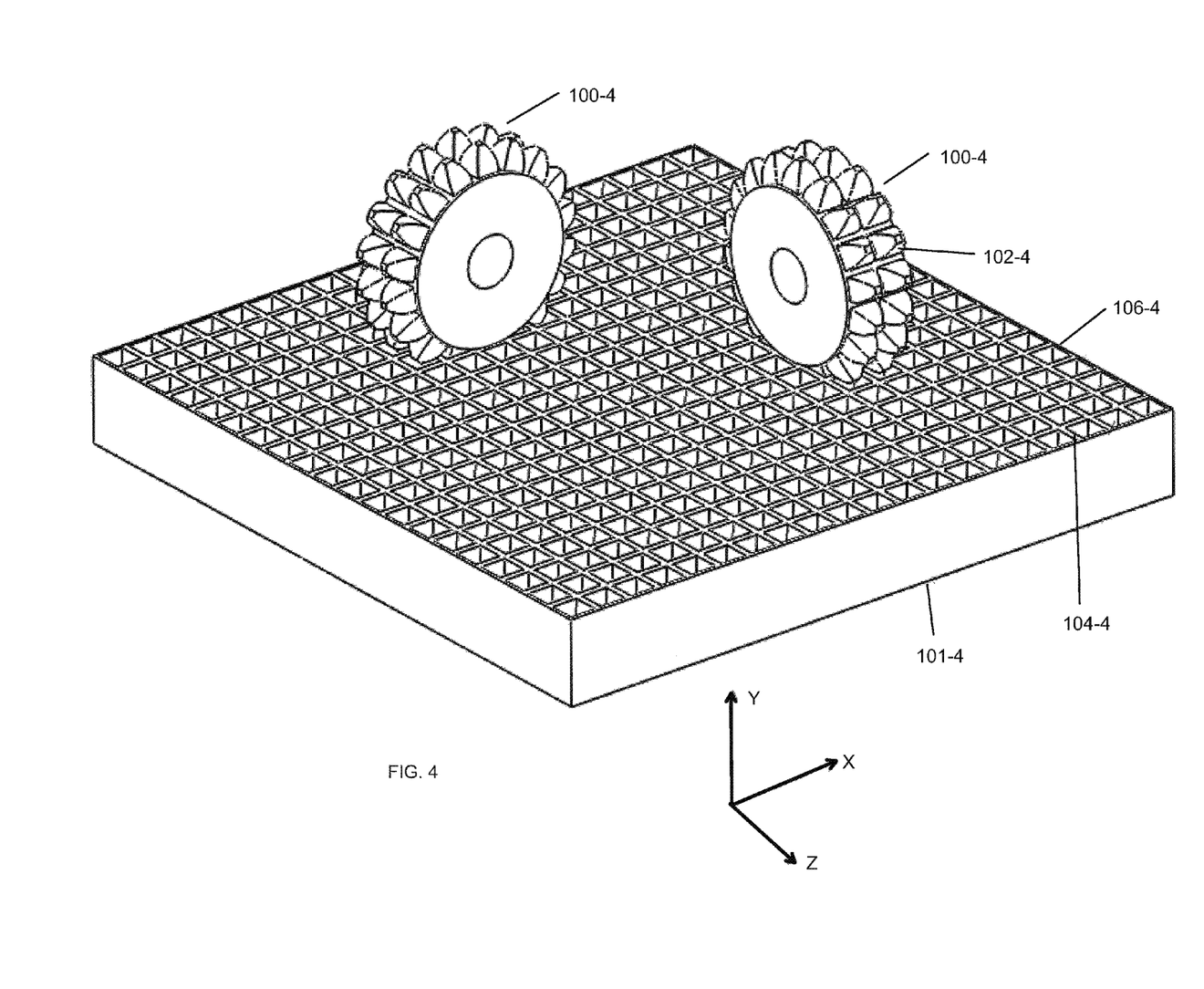
FIG. 4 schematically illustrates a bidirectional gear set in which the female bidirectional gear component is in the form of a flat sheet.
Figure 5:
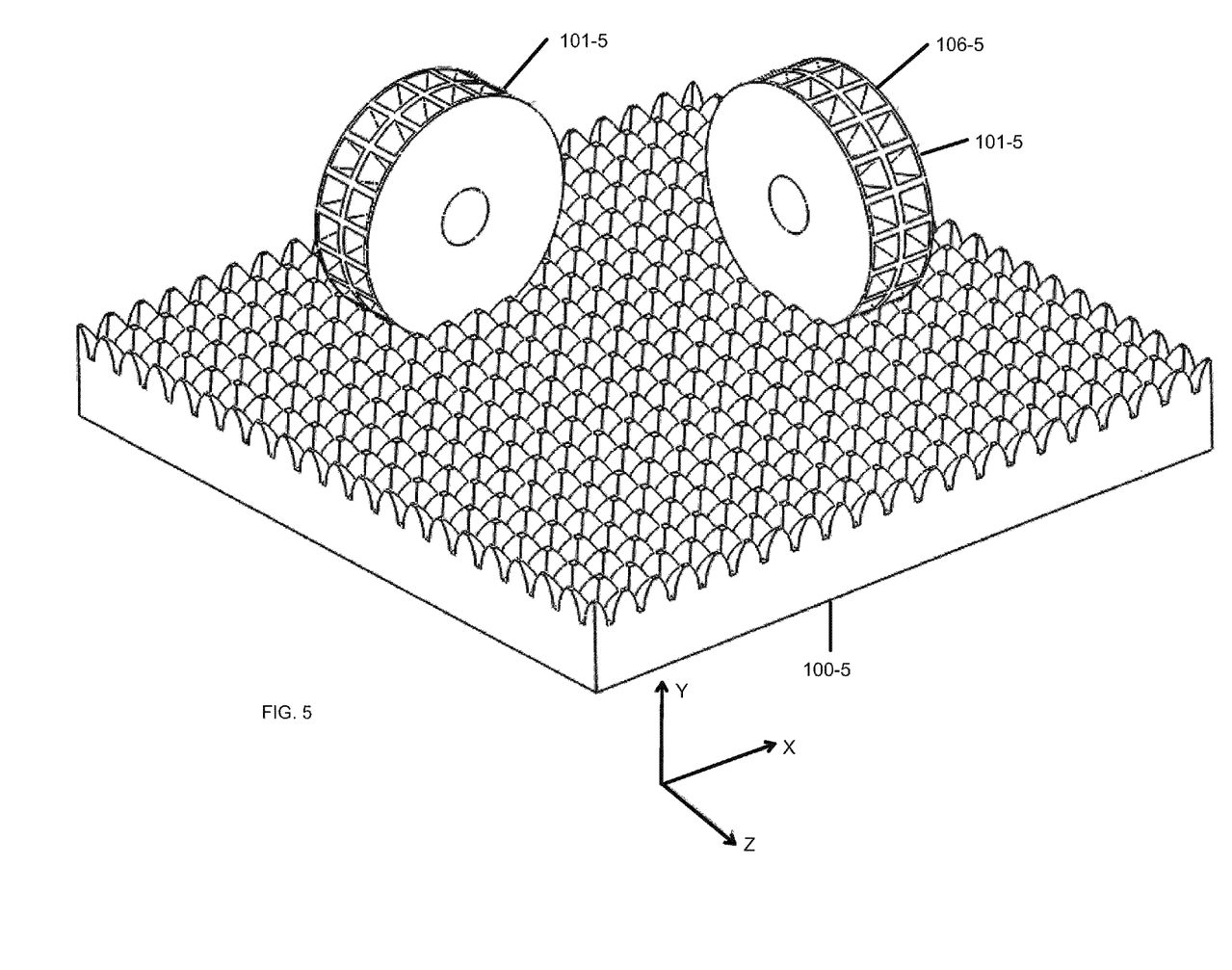
FIG. 5 schematically illustrates a bidirectional gear set in which the male bidirectional gear component is in the form of a flat sheet.

FIG. 1B shows a female bidirectional gear component 101-1 in the form of an elongate cylindrical rod made using a rapid prototyping machine. The female gear component 101-1 has a linear plurality of radial rows of inwardly-projecting (i.e., dedendum) sockets 104-1 as may be seen in expanded detail in FIGS. 4 and 6. Each row of dedendum sockets has radial axes that are normal to a central longitudinal axis of the gear component. Thus each of the two female bidirectional gear components 101-6 shown in FIG. 6 have two rows of dedendum sockets 104-6. As shown, each of the dedendum sockets has four symmetrically opposing faces and each socket has a full boundary edge 106 around the open end thereof as illustrated in FIGS. 1, 4, and 5. Similar to the radial rows of addendum teeth of the male bidirectional gear component, the radial rows of dedendum sockets of the female bidirectional gear component are regular and linear (as opposed to helical or non-orthogonal to the longitudinal axis of the gear rod).

As shown in FIGS. 4 and 5, respectively, both the male bidirectional gear component 100-4 and the female bidirectional gear component 101-5 are circular in cross section, have two rows of teeth 102-4 or sockets 104-5, and have a central bore. FIGS. 4 and 5, respectively, also show corresponding female bidirectional gear component 101-4 and male bidirectional gear component 100-5 in the form of flat sheets, in contrast to the gear components shown in FIG. 1, which are both cylindrical. It will thus be appreciated that as long as either the male bidirectional gear component or the female bidirectional gear component can rotate (or translate) and the corresponding female bidirectional gear component and male bidirectional gear component can translate (or rotate) when the gear set is in operative meshing contact, different shapes for the gear components are feasible. For example, as shown in FIG. 6, the male bidirectional gear component 100-6 is in the form of a flat sheet having a non-flat, contoured, toothed surface.

Figure 2A:
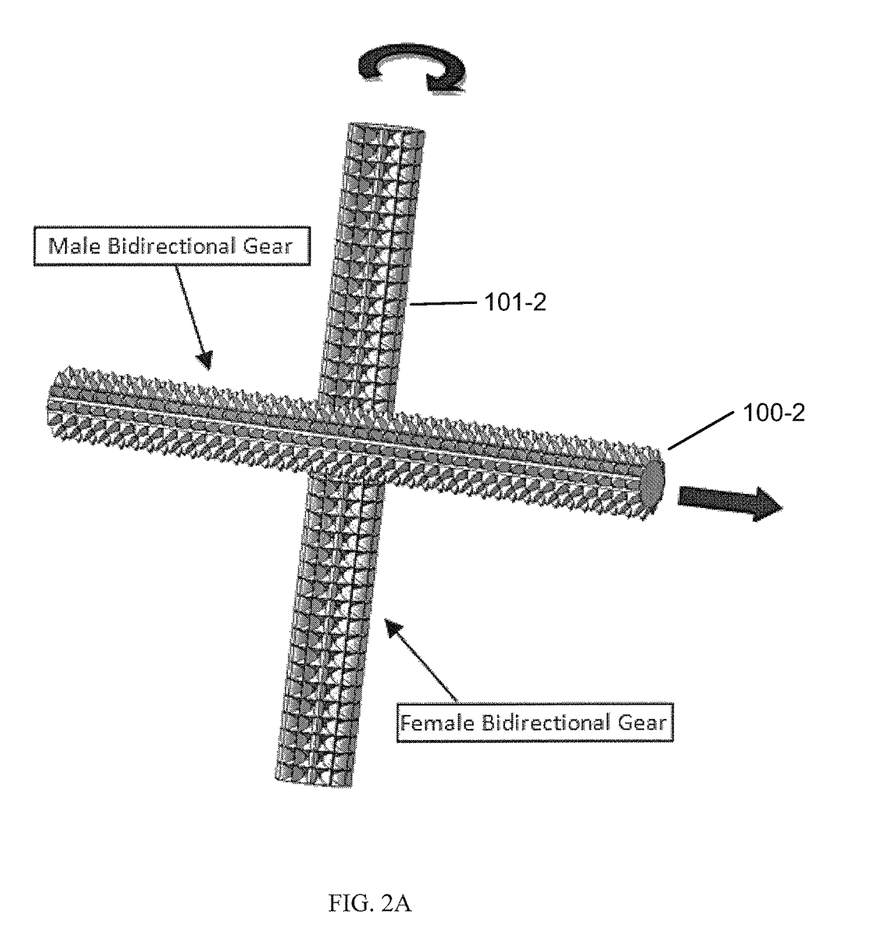
FIGS. 2A, B, respectively, show male/female bidirectional gear sets in a perpendicular orientation to illustrate the bidirectional (rotational and translational) motion capability, according to an illustrative, exemplary embodiment of the invention.
Figure 2B:
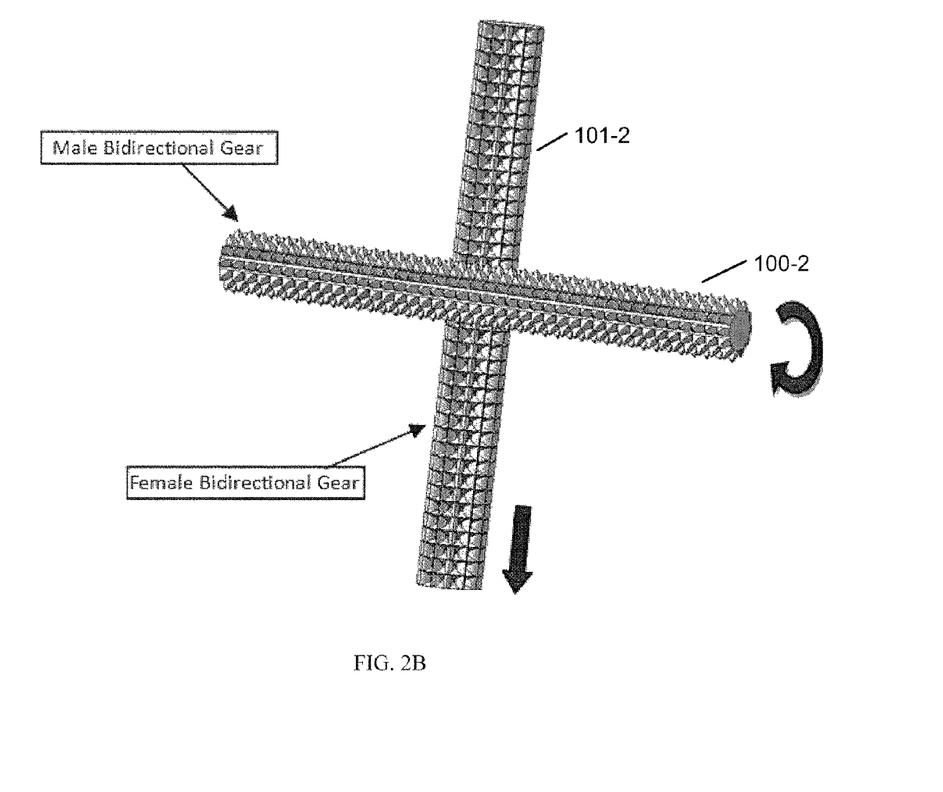

FIGS. 2A, B provide non-limiting exemplary illustrations of how a male/female bidirectional gear set may be set up in operation. The pair of bidirectional gears is designed to transfer motion and power like a regular spur gear and also perpendicular to the first direction like a spur gear rack. In FIG. 2A, a translational (linear) motion (straight arrow) of the male bidirectional gear 100-2 results in rotational motion (curved arrow) of the female bidirectional gear 101-2. With reference to FIG. 2B, without any setup change, rotational motion of the male bidirectional gear 100-2 results in translational motion of the female bidirectional gear 101-2. Instead of actuating the male bidirectional gear, the female bidirectional gear could also be actuated causing the resulting motion of the male bidirectional gear. If the rotation of the male bidirectional gear shown in FIG. 2B was restricted but the translational mechanism was performed, the female bidirectional gear would exhibit a rotational motion but would be restricted or locked in its translational motion. Thus, in an intermeshed state, neither the male nor the female component can 'slide' relative to the other regardless of whether the male and female components are arranged in a parallel or perpendicular orientation.

Figure 6:
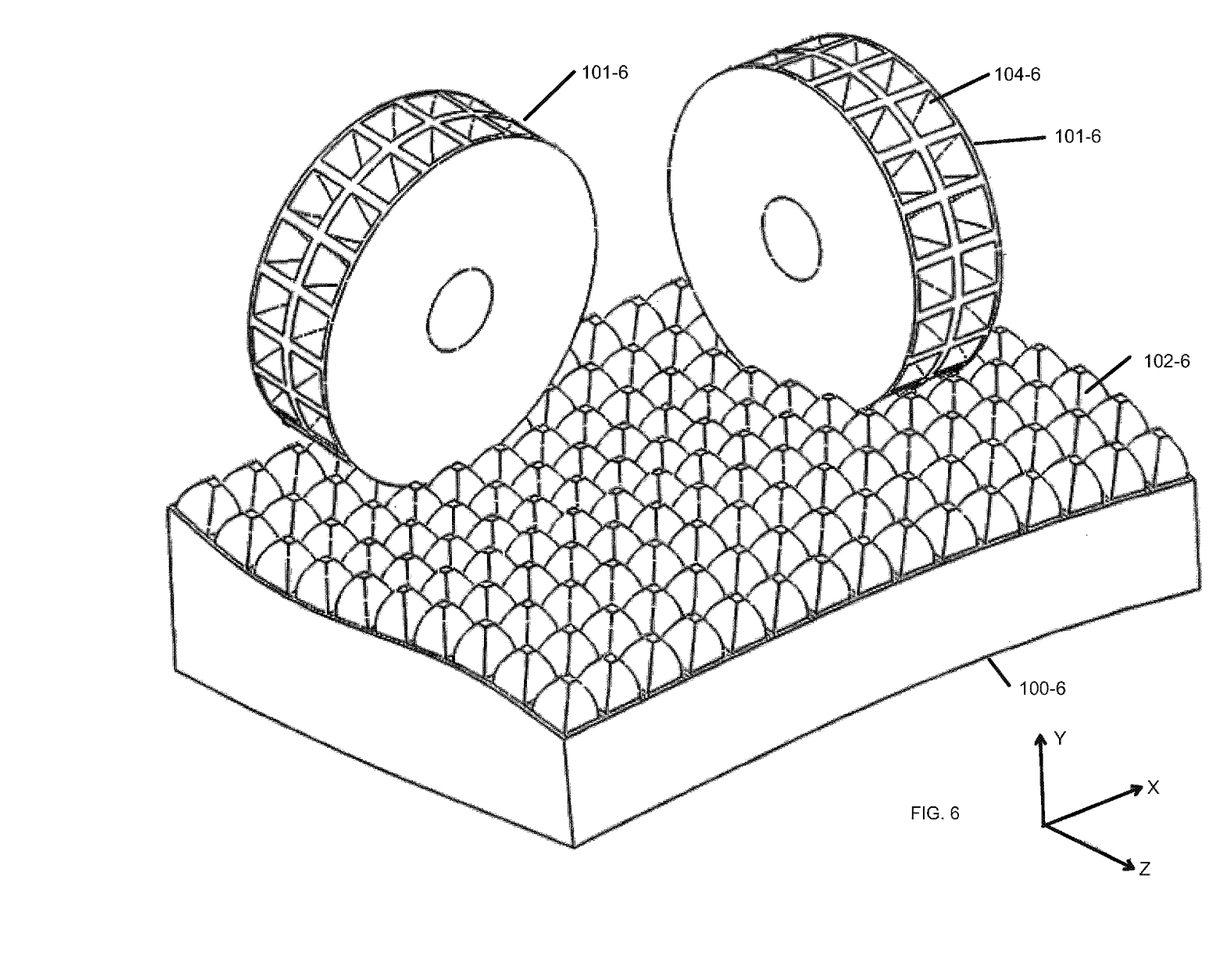
FIG. 6 schematically illustrates a bidirectional gear set in which the male bidirectional gear component is in the form of a flat sheet having a surface contour.

As can be further understood from FIGS. 4, 5, 6, clockwise/counterclockwise rotation of one of the circular gear components will result in the Out gear component translating either in the ±x-direction or the ±z-direction, and vice-versa.

Figure 3A:
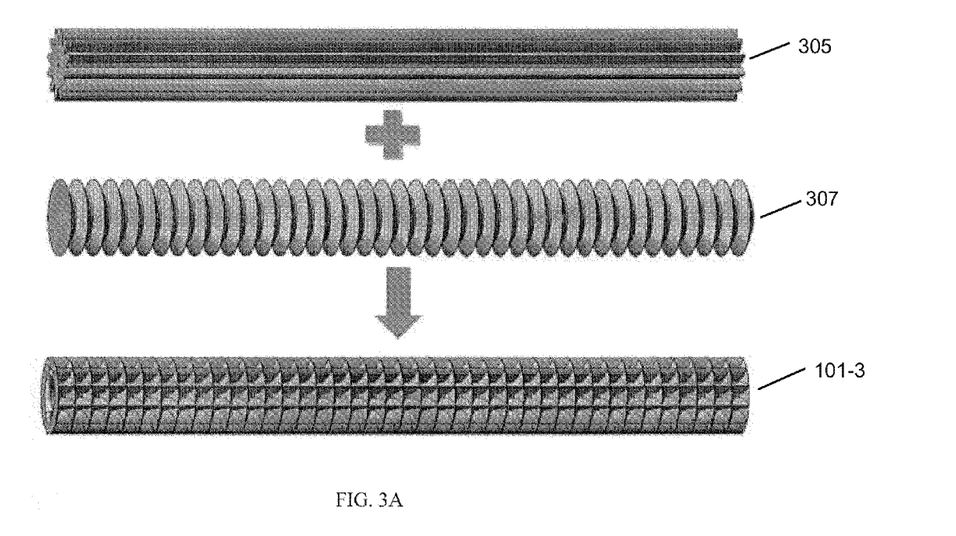
FIGS. 3A, B, respectively, show how a female bidirectional gear component and a male bidirectional gear component are designed/made, an illustrative, exemplary aspect of the invention.
Figure 3B:
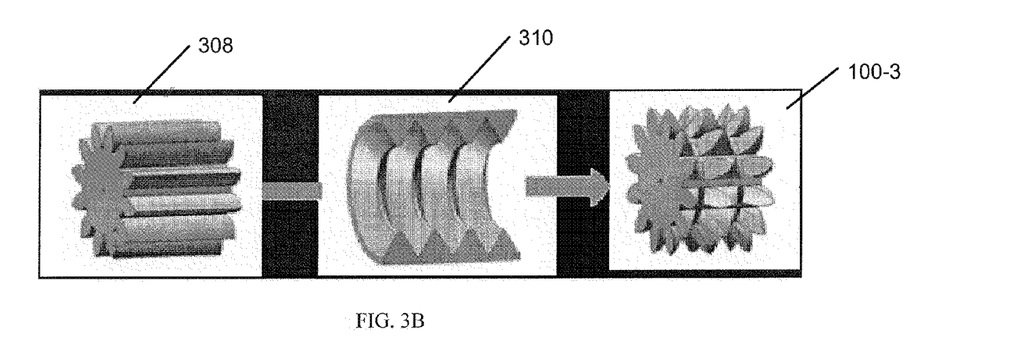

FIGS. 3A, B, respectively, are CAD drawings that illustrate how the female and male bidirectional gear components are designed to form elongate cylindrical rod gear gears. As illustrated in FIG. 3A, to create the female bidirectional gear, first a spur gear 305 is designed. Essentially any spur gear design can be used. Then a circular spur gear rack 307 is evolved and the two designs are merged. Essentially any spur gear rack design can be used. Accordingly, the female bidirectional gear component has an array of dedendum sockets wherein each dedendum socket has a full boundary edge around the open end thereof. As illustrated in FIG. 3B, to create the male bidirectional gear, first a spur gear 308 is designed. Essentially any spur gear design can be used. Then the outside contour of a spur gear rack 310 is evolved around the center of the spur gear and subtracted from the spur gear design. Essentially any spur gear rack design can be used. The resulting gear components are shown in FIGS. 1A, B. When the male and female bidirectional gear components are in a meshed, operative state, neither the male nor the female component can 'slide' relative to the other regardless of whether the male and female components are arranged in a parallel or perpendicular orientation. These features of the embodied invention can advantageously be applied in the successful development of structure-reconfiguring robots, for example, that require the capability to move in x, y, z directions without slippage.

More generally, the method of creating the female bidirectional gear component comprises the Boolean merging of swept spur gear profiles along two orthogonal axes of a surface. Making the female bidirectional gear component in a cylindrical geometry then involves revolving a contour of a circular spur gear rack around a rod axis, and merging the revolved spur gear rack with a spur gear thread in the orthogonal direction. Similarly, the method of creating the male bidirectional gear component comprises the Boolean subtraction of a swept spur gear profile from a second swept spur gear profile along two orthogonal axes of a surface. Making the male bidirectional gear component in a cylindrical geometry then involves revolving an outside contour of a spur gear rack around, and subtracting from, a spur gear.

The techniques can also be used to make flat-surface and contoured-surface gear component sheets as illustrated in FIGS. 4, 5, 6.

Essentially any solid material that can be machined can be used for the bidirectional gears. Non-limiting, exemplary methods of making the male bidirectional gear components include: cutting of necessary designs in a spur gear rod; rapid prototyping; casting; molding; cold or warm forming using a female bidirectional gear; and CNC machining. Non-limiting, exemplary methods of making the female bidirectional gear components include: rapid prototyping; casting; molding; cold or warm forming using a male bidirectional gear; and CNC machining.

The gear components and gear sets embodied herein can be used for raising platforms. A platform can have a single axis made out of a bidirectional gear. The matching bidirectional gear could be used to provide translational or rotational motion of the axis. Bidirectional gears could be used to replace spur gears. Female spur gear racks can be used as round spur gear rods as they do not have teeth extending in the environment; therefore, a female bidirectional gear can slide easier in, for example, a bushing and be less abrasive than regular spur gear racks. Female bidirectional gears are also safer to touch as they are round and don't have teeth extending into the environment. These are non-limiting advantages and applications of the invention.

Figure 7:
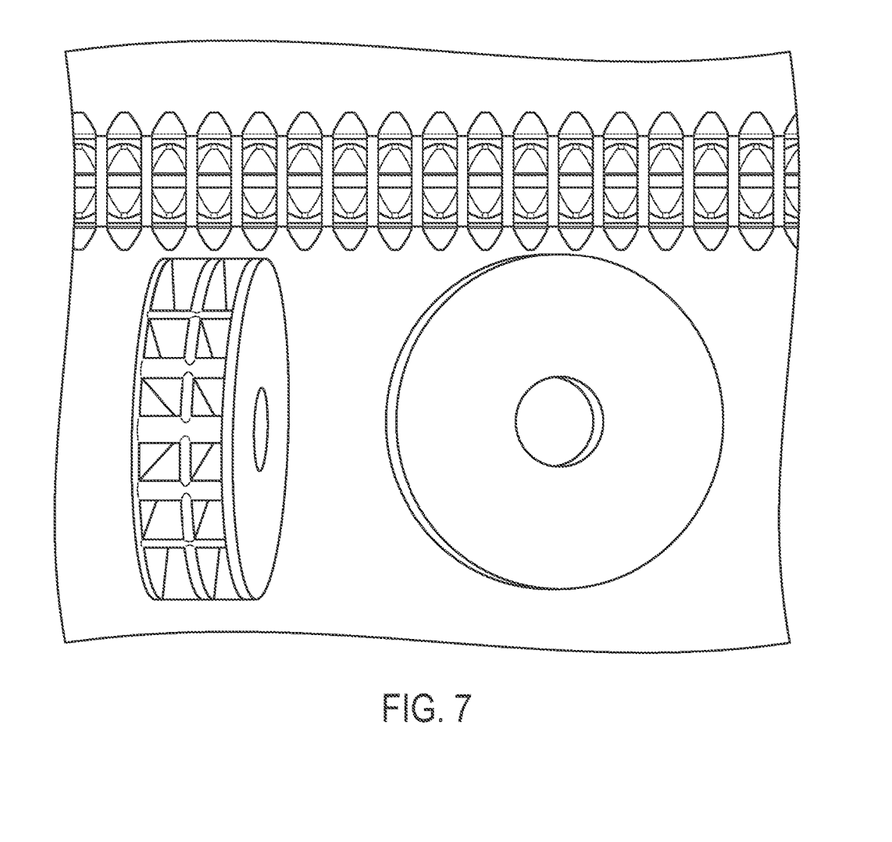

FIG. 7 shows geared truss elements and gears made from an Objet Eden 3D printer. The 0.004 inch resolution was fine enough to properly print 48 pitch gears as shown in the figure. The gears can either translate across or rotate about the truss element, while preventing motion in the other direction.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A bidirectional gear set, comprising:
a male bidirectional gear component having an array of addendum teeth; and
a female bidirectional gear component having an array of dedendum sockets, wherein each dedendum socket has a full boundary edge around an open end thereof further wherein bidirectional means gear-driven motion in both a translational state and a rotational state, as well as back and forth in both of these states.

2. The gear set of claim 1, wherein each of the male and female arrays of teeth and sockets are rectangular, non-helical arrays.

3. The gear set of claim 1, wherein one of the male and female gear components has a circular cross sectional geometry and the other has a non-circular cross sectional geometry.

4. The gear set of claim 3, wherein the non-circular cross sectional geometry is flat-planar.

5. The gear set of claim 3, wherein the non-circular cross sectional geometry is non-flat-planar.

6. The gear set of claim 1, wherein at least one of the male and female gear components is cylindrical, having a length along a longitudinal axis that is greater than a diameter along a radial axis that is perpendicular to the longitudinal axis.

7. The gear set of claim 1, wherein with respect to a single male component and a single female component in an intermeshed state, neither the male nor the female component can slide relative to the other regardless of whether the male and female components are arranged in a parallel or perpendicular orientation.

8. The gear set of claim 1, wherein the male and female gear components have an operational, intermeshed state in both a parallel orientation and a perpendicular orientation.

9. The gear set of claim 8, wherein the male and female gear components are limited to motion along a single common axis of movement.

10. The gear set of claim 1, wherein both the addendum teeth and the dedendum sockets are each cut in two directions.

11. A method of making a bidirectional gear set including a male bidirectional gear component having an array of addendum teeth and a female bidirectional gear component having an array of dedendum sockets, wherein bidirectional means gear-driven motion in both a translational state and a rotational state, as well as back and forth in both of these states, further wherein in an intermeshed state, neither the male nor the female component can slide relative to the other regardless of whether the male and female components are arranged in a parallel or perpendicular orientation, comprising at least one of:
creating the female bidirectional gear component having an array of dedendum sockets, wherein each dedendum socket has a full boundary edge around an open end thereof; and
creating the male bidirectional gear component having an array of addendum teeth.

12. The method of claim 11, wherein creating the female bidirectional gear component further comprises the Boolean merging of swept spur gear profiles along two orthogonal axes of a surface.

13. The method of claim 12, further involving making the female bidirectional gear component in a cylindrical geometry, further comprising:
revolving a contour of a circular spur gear rack around a rod axis; and
merging the revolved spur gear rack with a spur gear thread in the orthogonal direction.

14. The method of claim 12, further comprising making the female bidirectional gear component in the form of a sheet.

15. The method of claim 14, further comprising making the female bidirectional gear component in the form of a flat sheet.

16. The method of claim 11, wherein creating the male bidirectional gear component further comprises the Boolean subtraction of a swept spur gear profile from a second swept spur gear profile along two orthogonal axes of a surface.

17. The method of claim 16, further involving making the male bidirectional gear component in a cylindrical geometry, further comprising:
revolving an outside contour of a spur gear rack around, and subtracting from, a spur gear.

18. The method of claim 16, further comprising making the male bidirectional gear component in the form of a sheet.

19. The method of claim 18, further comprising making the male bidirectional gear component in the form of a flat sheet.

20. The method of claim 11, comprising making the male bidirectional gear component by one of cutting a suitable design in a spur gear rod; rapid prototyping; casting; cold or warm forming using a female bidirectional gear; molding; CNC machining; and 3-D printing.

21. The method of claim 11, comprising making the female bidirectional gear component by one of rapid prototyping; casting; cold or warm forming using a male bidirectional gear; CNC machining; molding; and 3-D printing.

* * * * *